Feb. 15, 1927.                    1,617,406
W. L. MARDEN
METER OPERATED CIRCUIT CLOSER
Filed Nov. 21, 1924         2 Sheets-Sheet 1
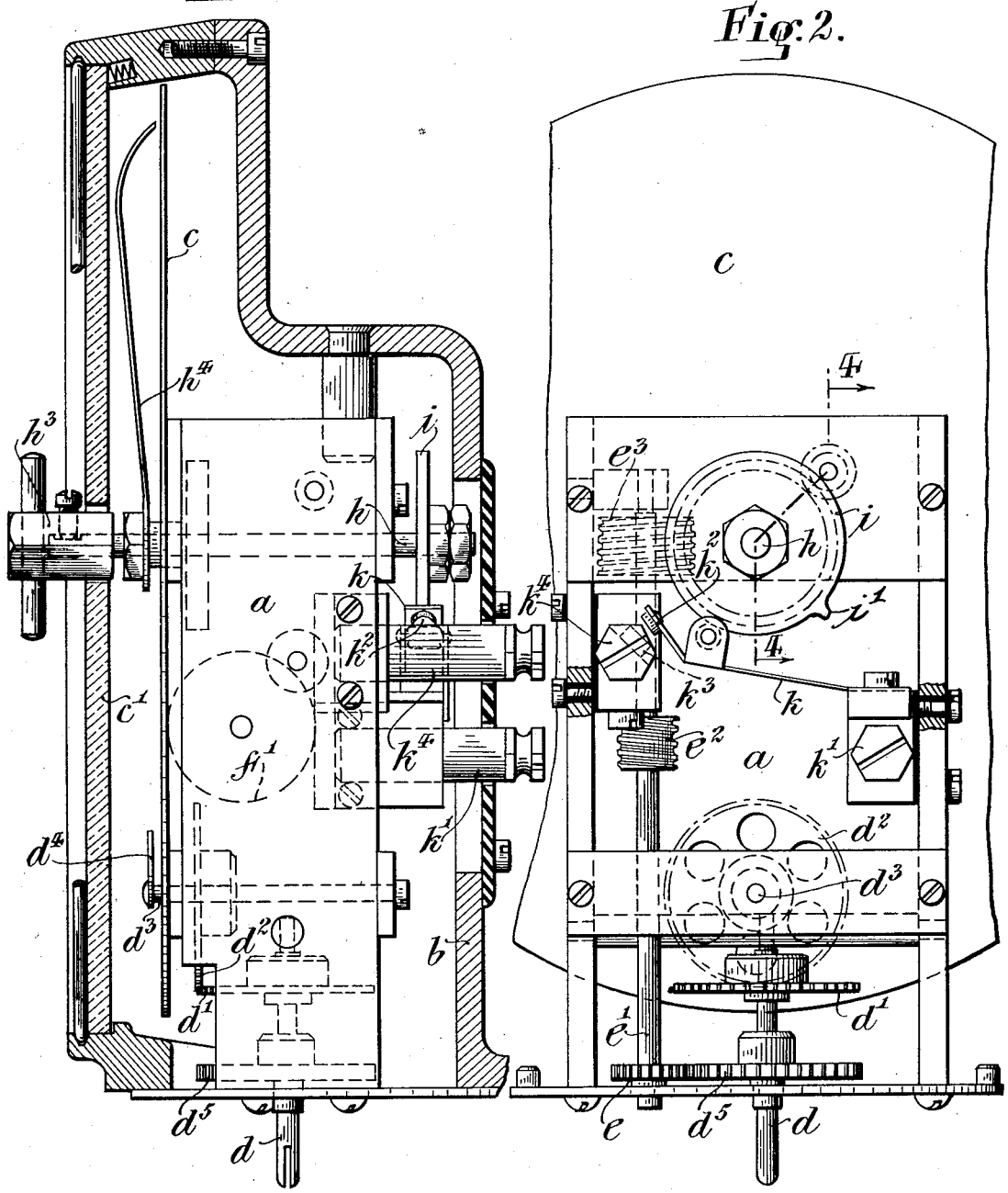
INVENTOR
William L. Marden
BY
Redding, Greeley, O'Shea Campbell
ATTORNEYS Feb. 15, 1927. 1,617,406
W. L. MARDEN
METER OPERATED CIRCUIT CLOSER
Filed Nov. 21, 1924   2 Sheets-Sheet 2
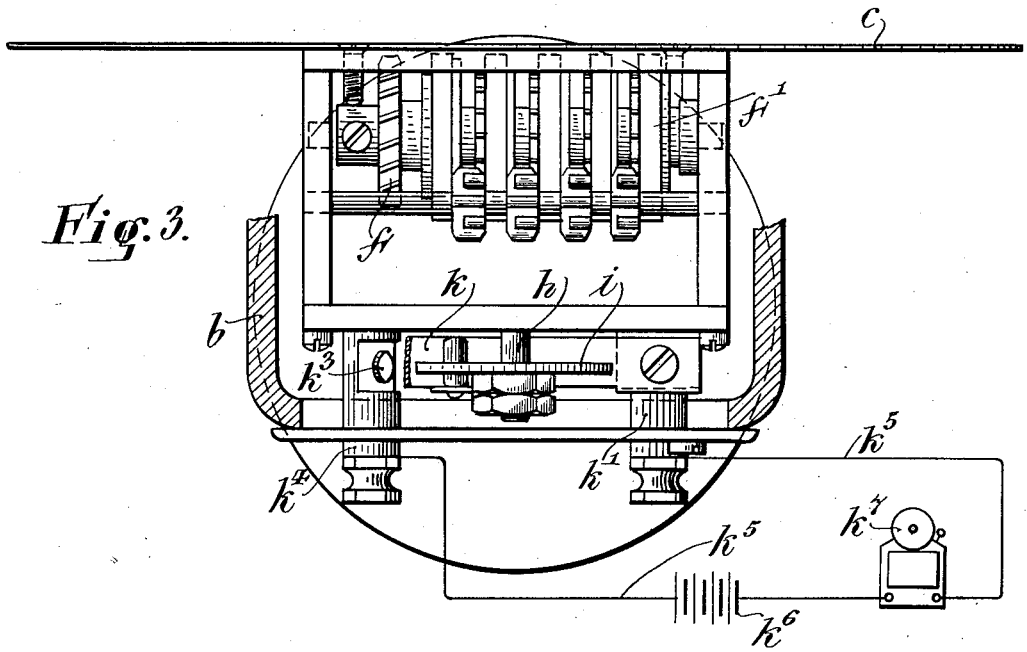
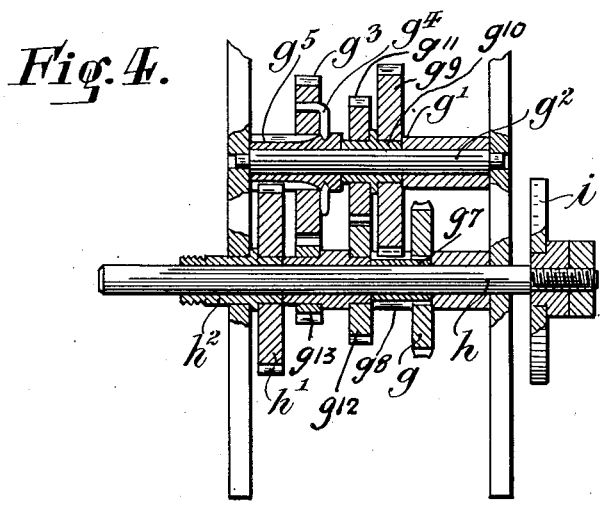
INVENTOR
William L. Marden
BY
Redding, Greeley, O'Shea Campbell
ATTORNEYS Patented Feb. 15, 1927.

1,617,406

UNITED STATES PATENT OFFICE.

WILLIAM L. MARDEN, OF NEW YORK, N. Y., ASSIGNOR TO NEPTUNE METER COMPANY, OF NEW YORK, N. Y., A CORPORATION OF NEW JERSEY.

METER-OPERATED CIRCUIT CLOSER.

Application filed November 21, 1924. Serial No. 751,294.

In certain industrial processes, such as those which involve the mixing of liquids, it sometimes becomes necessary to perform certain acts or to effect certain changes, such as the addition of another liquid or chemical, when a predetermined volume of a given liquid has passed through the conduit therefor. In such cases, particularly where the volume of liquid handled is large and the passage thereof requires considerable time it is desirable to provide means whereby a signal shall be given at or about the completion of the predetermined flow. It is the object of this invention to provide for association with a meter a registering device which shall cause a signal to be given at or about the completion of a predetermined flow and shall be capable of being set at will for any predetermined flow within the range of the register. The invention will be explained more fully hereinafter with reference to the accompanying drawings in which it is illustrated and in which—

Figure 1 is a view in elevation of a registering mechanism which embodies the invention, the casing being shown in section.

Figure 2 is a view of the registering mechanism as seen from the right hand in Figure 1, the dial being broken away to save space.

Figure 3 is a top view of the registering mechanism with a portion of the casing shown in horizontal section.

Figure 4 is a detail view in section of the reduction gearing.

In the embodiment of the invention illustrated in the drawings, the registering mechanism, indicated generally at $a$, is enclosed within a suitable casing $b$ which supports a suitable dial $c$. The casing is intended to be supported upon the casing of a meter not shown which may be of suitable construction, from which the registering mechanism receives motion through a vertical driving shaft $d$. In the construction shown the shaft $d$, through gears $d'$ and $d^2$, drives a shaft $d^3$ which carries a unit indicator hand $d^4$. The shaft $d$, in the construction shown, also carries a gear $d^5$ which meshes with a pinion $e$ on a driven shaft $e'$ which is mounted in suitable bearings in the supporting framework and carries a worm $e^2$ in engagement with a worm wheel $f$ of a totalizing register, of suitable construction, indicated by a broken line at $f'$ in Figure 1 and shown in top view at $f'$ in Figure 3.

The shaft $e^1$ also carries the worm gear $g$ on a sleeve $g^7$ loose on counter shaft $h$ and provided with gear teeth $g^8$ which mesh with the teeth of gear $g^9$ on sleeve $g^{10}$ loose on a fixed shaft $g^2$ parallel with countershaft $h$. Sleeve $g^{10}$ carries also gear $g^{11}$, the teeth of which mesh with the teeth of gear $g^{12}$ on sleeve $h^3$, loose on countershaft $h$. Sleeve $h^3$ also carries pinion $g^{13}$ the teeth of which mesh with the teeth of gear $g^3$ which is loose on the hub of pinion $g^5$ but is frictionally held thereto by spring $g^4$. The teeth of hub $g^5$ mesh with the teeth of gear $h^1$ of sleeve $h^2$ which is fast on countershaft $h$.

It will thus be seen that as the driven shaft $e^1$ is rotated operating the totalizing register indicated at $f^1$ through worm $e^2$, its worm $e^3$ will rotate worm gear $g$ which through the teeth $g^8$ of sleeve $g^7$ will rotate gear $g^9$ at less speed which through smaller gear $g^{11}$ will rotate gear $g^{12}$ at reduced speed which, in turn, through gear $g^{13}$ will rotate gear $g^3$ at further reduced speed, the rotation imparted to gear $g$ being thus transmitted to gear $g^3$ greatly reduced. The spring $g^4$ normally holds gear $g^3$ on hub $g^5$ which rotates gear $h^1$ and with it sleeve $h^2$ and shaft $h$ at a speed substantially less than the reduced speed imparted to gear 3.

At one end, in front of the dial $c$ and the protecting glass $c'$, the shaft $h$ is provided with a handle $h^3$ by which it may be turned, and secured to the shaft, preferably between the dial and the protecting glass, or to the sleeve $h^2$ which virtually forms a part of the shaft $h$, is an indicating hand or pointer $h^4$. The shaft also has secured thereto, preferably between the supporting framework of the register mechanism and the casing, an alarm operating member $i$ which is shown as a disc having a cam finger $i'$. In the construction shown the alarm or signal operating member $i$ co-acts with a spring $k$ which is carried by a binding post $k'$, its contact $k^2$ co-acting with a contact $k^3$ carried by another binding post $k^4$. The binding posts $k'$ and $k^4$ are shown as connected into an electric circuit $k^5$ which includes a source of electric energy $k^6$ and an audible alarm $k^7$.

In the use of the device the pointer $h^4$, by means of the handle $h^3$, is set to any desired point on the dial $c$, the signal operating member $i$ being moved at the same time with the pointer $h^4$ so that the same relation is established between the cam finger $i'$ and the spring $k$ as that which is established between the pointer $h^4$ and the zero mark on the dial. The frictional connection between the pinion $g^5$ and the gear $g^3$ through spring $g^4$ permits shaft $h$ which carries the indicator hand and the signal operating device to be rotated for setting without affecting the register mechanism. In such setting the gear $h^1$ rotates the pinion $g^5$ and by reason of the frictional connection with gear $g^3$ pinion $g^5$ rotates without rotating gear $g^3$. If now the register mechanism is actuated, not only will the totalizing register $f'$ be operated but the pointer $h^4$ will be moved and at the same time the signal operating member $i$ will be moved so that when the pointer $h^4$ reaches, for example, the zero point from which it has been set, the signal operating member $i$ will operate the signal by closing the circuit between the contacts $k^2$ and $k^3$ whereby the attention of the attendant will be called to the fact that the predetermined volume of fluid, as measured by the meter, has passed through the conduit or entered the receptacle therefor.

I claim as my invention:

In an alarm mechanism for meters the combination with a driving shaft and means carried thereby for operating the register, a driven shaft parallel with the driving shaft and in gear therewith provided with a worm, a countershaft at right angles to the driven shaft having a worm wheel loosely mounted thereon, the countershaft also carrying means for actuating an alarm mechanism, a fixed shaft parallel with the countershaft, intermeshing reducing gears mounted to rotate freely on the countershaft and fixed shaft, including a frictionally mounted gear arranged to normally drive the countershaft, and means for rotating the countershaft independently of the frictionally mounted gear.

This specification signed this 19th day of November A. D. 1924.

WILLIAM L. MARDEN.